UNITED STATES PATENT OFFICE.

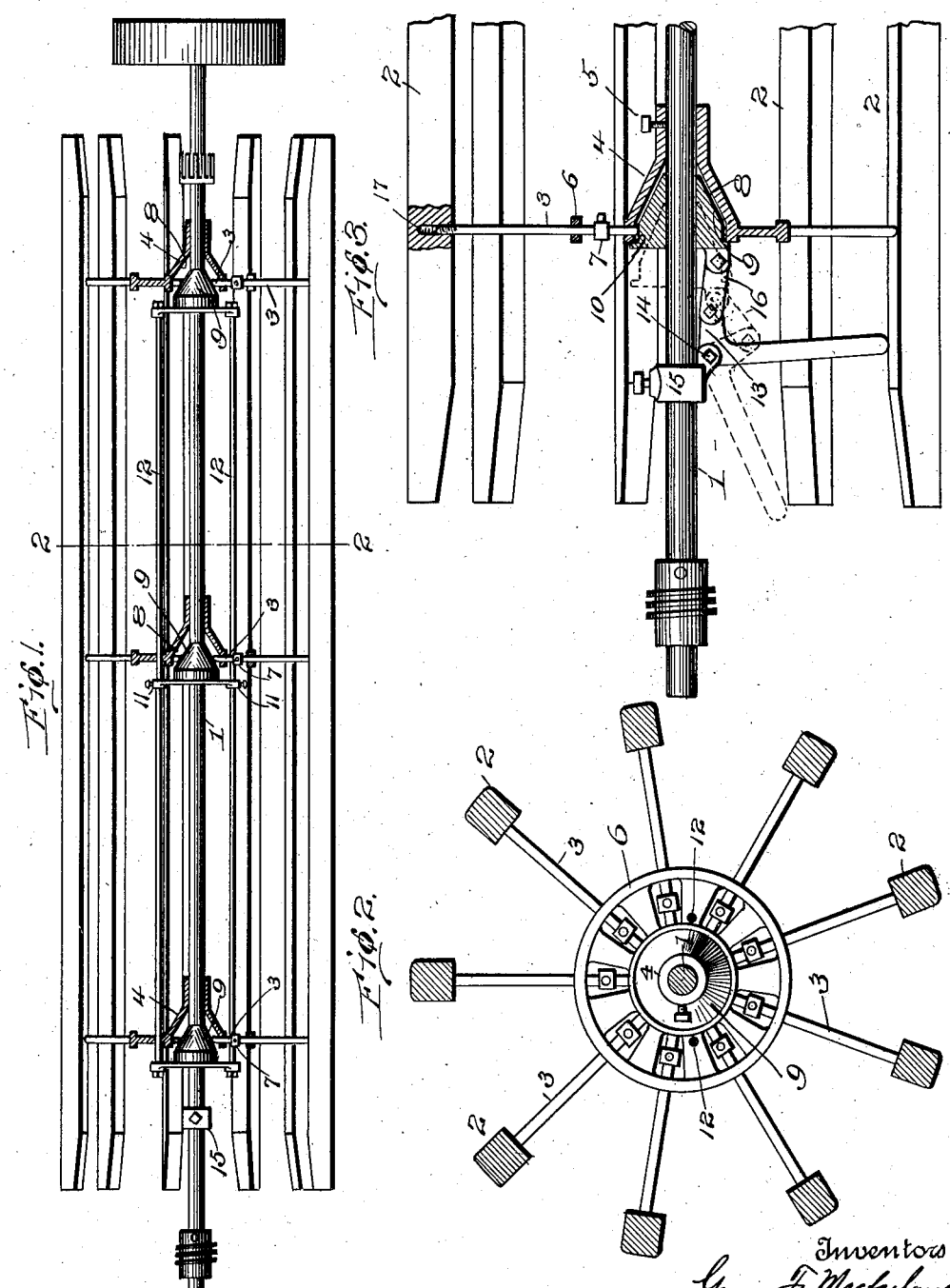

GEORGE F. MACFARLANE AND EDWARD McGROARTY, OF WILKES-BARRE, PENNSYLVANIA.

SKEIN-REEL.

1,027,555.  Specification of Letters Patent.  Patented May 28, 1912.

Application filed June 27, 1910. Serial No. 569,224.

*To all whom it may concern:*

Be it known that we, GEORGE F. MACFARLANE and EDWARD McGROARTY, citizens of the United States, and residents of Wilkes-Barre, county of Luzerne, State of Pennsylvania, have invented certain new and useful Improvements in Skein-Reels, of which the following is a specification.

The present invention relates to improvements in skein or winding reels of that type or character which are adapted to be expanded or contracted as may be desirable in winding or removing skeins.

The object of the invention is to improve the general construction of such reels, and particularly to provide improved means for maintaining the circular series of bars upon which the skeins are formed or received at a uniform distance from the axis of the reel, for adjusting the bars to parallel relation with the axis, to quickly contract the reel to receive or discharge skeins and to quickly and accurately expand it for winding or unwinding.

The invention will be described in connection with the accompanying drawing, in which:

Figure 1 is a vertical longitudinal sectional view through a reel constructed in accordance with the present invention showing the same contracted; Fig. 2 is a transverse section on an enlarged scale about on the line 2—2, Fig. 1; Fig. 3 is a longitudinal sectional view of a portion of the reel on the same scale as Fig. 2, the parts being shown in expanded position in full lines.

Referring to the drawings, it will be seen that the reel comprises essentially a central shaft 1, a series of bars 2 and arms 3 which are connected with and extend radially outward from the shaft and on which the bars 2 are mounted.

In the particular embodiment of the invention illustrated there are three series of supporting arms 3, each being mounted in a spider-like flange at one end of a collar 4 which is secured to the shaft 1 by a set screw 5 or other suitable fastening means. Each arm 3 slides freely through alined openings in the outer and inner ring-like sections 6 of said spider flange and outward movement of the arm is limited by a stop collar 7 adjustably secured thereon and adapted to contact with the outer ring 6.
The collar 4 is provided with a recess or socket into which the inner ends of the arms 3 extend. On the shaft 1, adjacent each of the collars 4, is mounted a sleeve 9 having a conical exterior surface adapted to enter the socket 8 and force the arms 3 radially outward. At its larger end this expander 9 is provided with a cylindrical section 10 upon which all of the arms 3 of the series coöperating therewith rest when the reel is in its expanded condition. Each expander 9 is provided with oppositely projecting arms 11, which are connected by suitable rods 12 so that all of the expanders are adapted to be simultaneously reciprocated on the shaft to expand the reel or permit the bars thereof to move inwardly. The particular means shown for thus shifting the expanders comprise a lever 13 fulcrumed at 14 upon a lug projecting from a collar 15 suitably fixed on the shaft 1, said lever being connected by a link 16 with one of the expanders.

Referring to Fig. 3, it will be seen that when the expanders are shifted to move the bars 2 outwardly, the toggle formed by the lever 13 and link 16 is in such position that the parts are locked and the reel is thus held in its expanded condition.

In using a reel of this type or character, it is very important that the outer or operative sides of all of the bars 2 be situated the same distance from the axis of the shaft and in order to compensate for shrinkage of the bars or any slight difference in the lengths of the connecting arms or wear and shortening of the inner ends thereof, means are provided whereby said bars may be adjusted relatively to the shaft. As shown, the outer end of each bar is threaded and extends into and engages a suitable threaded socket 17 in the bar 2. By rotating any arm 3 the bar 2 connected therewith can be moved to or from the shaft 1. The bars 2 are preferably made of wood and it is not therefore necessary that specially threaded sockets 17 be provided, as the threaded ends of the arms 3 can be screwed directly into the body of the bar.

The manner of using or operation of such a reel as is herein described will be readily understood. When it is desired to use the same for winding, the expanders 9 are properly adjusted to move the arms 3 and bars 2 connected therewith outwardly, and the reel is then rotated to wind the skein. Upon the completion of the desired winding operation, the expanders can be shifted to bring the conical portions thereof in alinement with the arms 3 and the upper bars will then by gravity move inwardly or they can as well as the side bars be thus moved to contract the reel by a slight pressure so that the skeins can be readily removed. While in contracted form, skeins which it may be desired to unwind can be easily slipped upon the reel and then by properly adjusting the expanders the bars 2 can be moved outwardly so that the skeins will be properly supported.

Having thus described the invention what is claimed is,

1. In a skein reel, the combination with a rotatable shaft, of a series of fixed collars thereon, each collar having an open-ended socket in which the shaft is centrally arranged, a series of radially movable arms carried by each of said collars and having their inner ends extending into the sockets, parallel bars connected with the outer ends of the corresponding arms of each series, conical expanders mounted on the shaft, one of said expanders being slidable into and out of the socket of each collar, means external to the shaft for connecting the expanders to cause them to move simultaneously, and toggle levers connected to said expanders and arranged to quickly withdraw the expanders and replace and lock the same in their sockets.

2. In a skein reel, the combination with a rotatable shaft, of a series of fixed collars thereon, each collar having an open-ended socket in which the shaft is centrally arranged, a series of radially movable arms carried by each of said collars and having their inner ends extending into the sockets, parallel bars adjustably connected with the outer ends of the corresponding arms of each series, conical expanders mounted on the shaft, one of said expanders being slidable into and out of the socket of each collar, means external to the shaft for connecting the expanders to cause them to move simultaneously, and toggle levers connected to said expanders and arranged to quickly withdraw the expanders and replace and lock the same in their sockets, said toggle levers being mounted on and rotatable with the shaft.

3. In a skein reel, the combination with a rotatable shaft, of a series of fixed collars thereon, each collar having an open-ended socket in which the shaft is centrally arranged, and outer and inner rings surrounding the socket, a series of radially movable arms carried by said outer and inner rings and having their ends extending into the sockets, parallel bars adjustably connected with the outer ends of the corresponding arms of each series, conical expanders mounted on the shaft, one of said expanders being slidable into and out of the socket of each collar, means external to the shaft for connecting the expanders to cause them to move simultaneously, and toggle levers connected to said expanders and arranged to quickly withdraw the expanders and replace and lock the same in their sockets.

In testimony whereof we affix our signatures in presence of two witnesses.

GEORGE F. MACFARLANE.
EDWARD McGROARTY.

Witnesses:
JOHN P. POLLOCK,
JOSEPH L. CAREY.

---

Copies of this patent may be obtained for five cents each, by addressing the "Commissioner of Patents, Washington, D. C."